United States Patent [19]
Brewer

[11] 3,831,789
[45] Aug. 27, 1974

[54] WASTE REMOVAL VEHICLE AND STRUCTURE ASSOCIATED THEREWITH

[75] Inventor: John C. Brewer, Salt Lake City, Utah

[73] Assignee: Garbalizer Corporation of America, Salt Lake City, Utah

[22] Filed: Dec. 14, 1972

[21] Appl. No.: 315,130

[52] U.S. Cl. .................... 214/82, 74/459, 254/100
[51] Int. Cl. .................... B60p 1/00, B65g 67/26
[58] Field of Search ............ 214/82, 514, 83.3, 510; 74/459, 89.15; 254/98, 99, 100

[56] References Cited
UNITED STATES PATENTS

| | | | |
|---|---|---|---|
| 1,088,104 | 2/1914 | Sharp | 214/82 X |
| 2,258,988 | 10/1941 | Le Laurin | 214/82 |
| 2,561,755 | 7/1951 | Recker | 214/82 |
| 2,760,658 | 8/1956 | Smith | 214/82 |
| 2,808,158 | 10/1957 | Gilleo | 214/82 |
| 2,810,486 | 10/1957 | Elton | 214/82 |
| 3,074,571 | 1/1963 | Dean | 214/82 |
| 3,132,719 | 5/1964 | Cole | 74/459 X |
| 3,148,786 | 9/1964 | Boeck et al. | 214/82 |
| 3,643,521 | 2/1972 | Nilsson | 74/459 |
| 3,720,328 | 3/1973 | Mackensie | 214/82 |

*Primary Examiner*—Robert J. Spar

[57] ABSTRACT

The truck type vehicle constructed to receive, transport and dump municipal waste, garbage, industrial debris and so on, and this using for storage a maximum of space within the truck body, notwithstanding the inclusion of apparatus for compacting or packing material preparatory to the taking on of subsequent loads. The subject truck includes a packer panel driven fore and aft within the truck body by a threaded shaft. The shaft is journaled forwardly and also at a rear door rearwardly of and a part of the truck body. The packer panel supports its driven threaded shaft, when the rear door is open, by the packer panel being proximate its rear-most extremity. Means are provided for keeping the threaded shaft of the truck body clean from debris and bearing surfaces free of dirt or other foreign matter. Means are provided for powering the packer panel, through revolvement of the threaded shaft, either by the power take-off of the truck or by a gear reduced electric motor drive. Safety means are provided such that the packer panel will not exceed its predetermined limits of travel and, also, can be stopped at any time and at any point intermediate of such extremities. Means are provided for keeping clean wear surfaces and caster and track surfaces, as applies to the caster supported packer panel.

4 Claims, 23 Drawing Figures

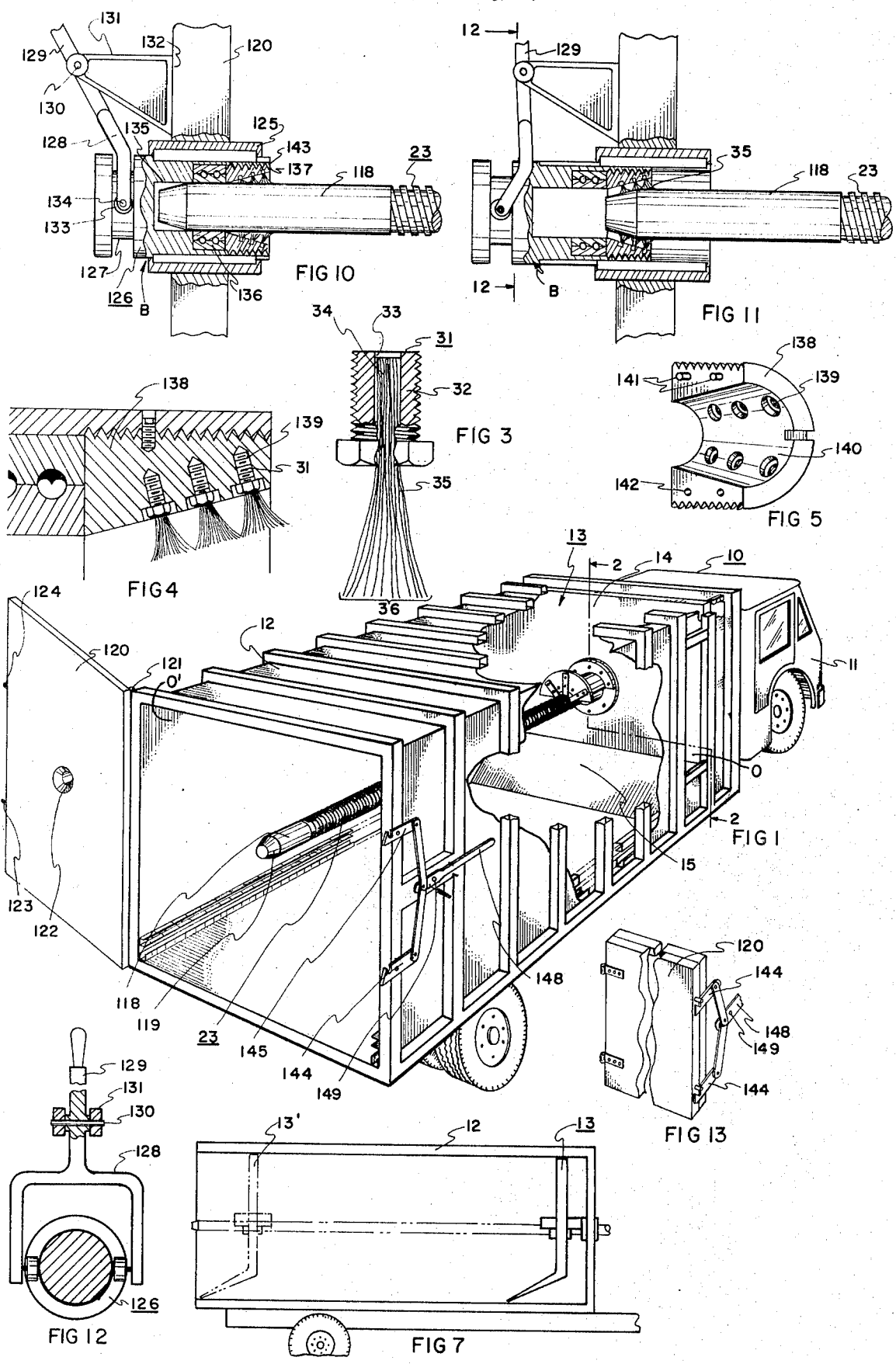

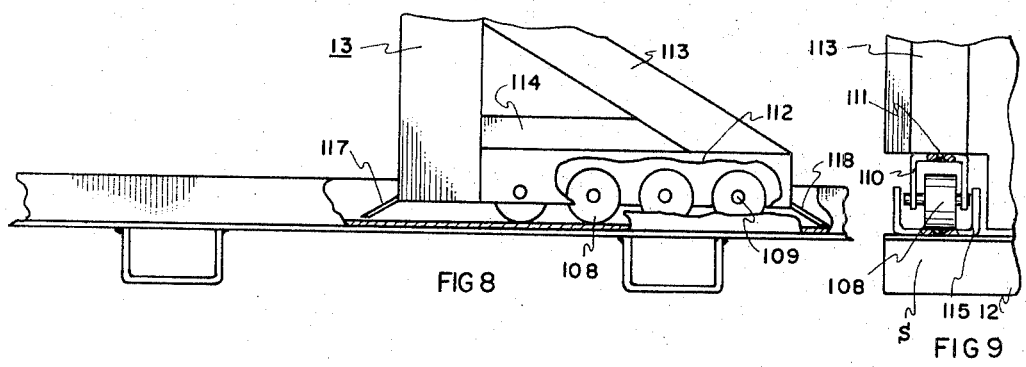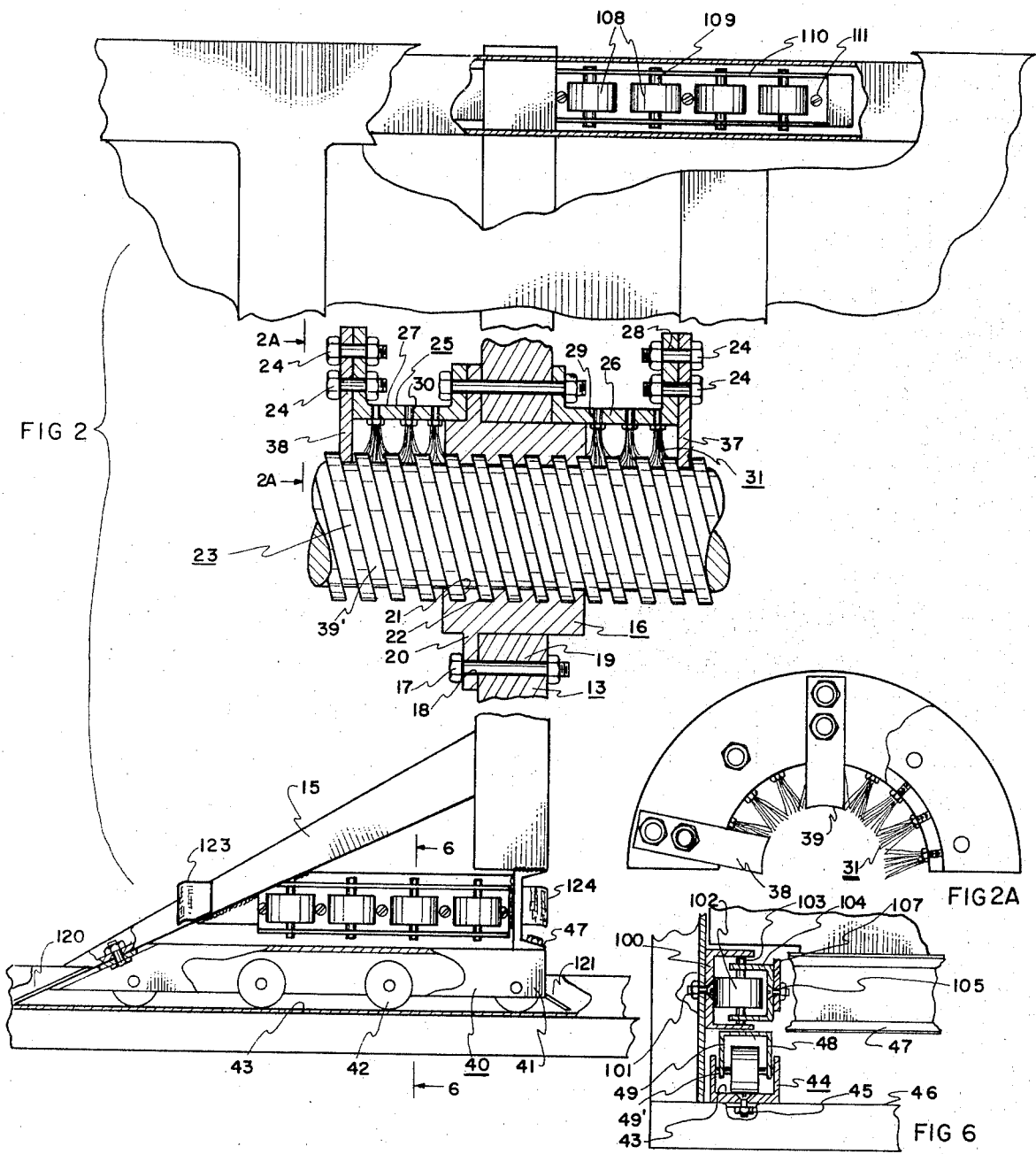

FIG 14 ELECTRIC MOTOR DRIVE

FIG 16 POWER TAKE-OFF DRIVE

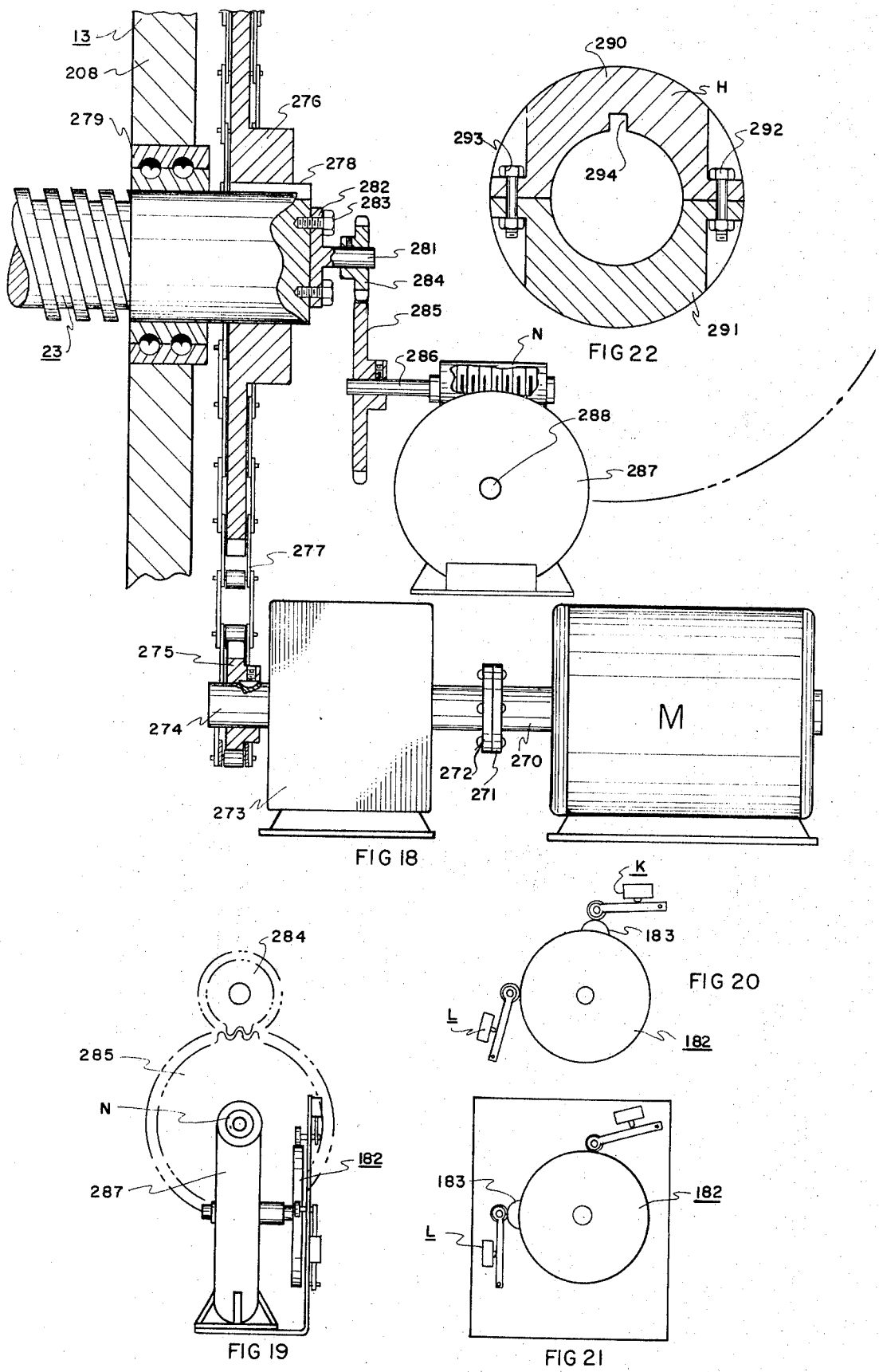

WASTE REMOVAL VEHICLE AND STRUCTURE ASSOCIATED THEREWITH

The present invention relates to waste receiving trucks such as municipal garbage trucks and the like and, more particularly, to a new and improved truck of the type described, wherein the truck body utilizes a maximum of its interior for receiving and periodically packing waste materials to be deposited therein.

During recent years the sanitation industry has developed a number of truck designs such as municipal garbage trucks which are especially designed to receive garbage, waste materials and other debris and for packing the same such that additional materials can be received by the truck body.

Current designs of such trucks are such that the packing apparatus requires an inordinate amount of space for its containment, thereby restricting the actual receiving and storing capacity of the truck body.

An object of the present invention therefore is to provide a new and useful truck body for receiving garbage and waste materials and the like, wherein the packing apparatus thereof requires a minimum of space, thus leaving a maximum of the truck body interior for receiving and temporarily storing municipal garbage debris and other materials introduced into the body.

A further object of the invention is to provide an improved transport vehicle for receiving, packing and transporting municipal waste, garbage and like debris to a dump area or collection station.

A further object is to provide a waste transport vehicle wherein the vehicle is provided with a packer blade constructed for fore and aft movement within the truck body in an upright position.

An additional object is to provide packer panel structure in a truck body, driven by a threaded shaft in both fore and aft directions.

An additional object is to provide packer panel structure in a truck body, the same being driven by a threaded shaft and having means for cleaning such shaft proximate bearing surfaces and also proximate packer panel engagement with the shaft.

A further object is to provide a waste receiving vehicle having a horizontally reciprocating packet panel wherein the same is supported at its bottom and sides by casters or similar means.

An additional object is to provide a caster supported packer panel in a truck body wherein cleaning means are provided the packer panel for cleaning tracks the casters are to advance upon.

An additional object is to provide a waste receiving vehicle having a horizontally reciprocating packer panel for advancing debris within the vehicle body, the same being coupled to the mechanical power take-off of the vehicle and having control means and/or safety means provided therefor.

An additional object is to provide a waste receiving vehicle having a reciprocating packer panel, with the latter being driven by an electrical motor supplied by circuit means intercoupling the motor with the primary electrical system of the vehicle.

An additional object is to provide both cab and remote stations for controlling a waste receiving vehicle supplied with a horizontally reciprocable packer panel.

A further object is to provide, for a waste receiving vehicle, certain safety switch means and cam structure so as to predetermine the outer limits of travel of the packer panel of the vehicle as well as provide other useful functions.

The features of the present invention may best be understood by reference to the following description taken in connection with the accompanying drawings in which:

FIG. 1 is a perspective view, partially broken away for clarity, of a vehicle including a truck body and accessories constructed in accordance with a preferred embodiment of the present invention; in FIG. 1 the rear door of the truck body has been opened upon release of the support journal or bearing from the rear of the threaded drive shaft of the packer panel.

FIG. 2 is an enlarged elevation, partially broken away in section, and is taken along the line 2—2 in FIG. 1.

FIG. 2A is a rear elevation taken along the line 2a—2a in FIG. 2 and illustrates a representative structure usable for cleaning, by both blade and brush means, the central threaded shaft shown.

FIG. 3 is an enlarged, vertical section of a representative cleaner brush usable for cleaning the central threaded drive shaft of the invention.

FIG. 4 illustrates a portion of the bearing mount used to journal the rear extremity of the threaded drive shaft of the packer panel, the same also incorporating a plurality of brushes as shown in FIG. 3 which serve to keep the journal area clean.

FIG. 5 is a perspective view of a shell or housing half used in the structure of FIG. 4 to mount the cleaning brushes of FIG. 3.

FIG. 6 is a fragmentary view, partially broken away in section and taken along the line 6—6 of FIG. 2, illustrating the caster and track structure utilized at the lower opposite extremities of the packer panel to support the same in its fore and aft movement as driven by its threaded drive shaft.

FIG. 7 is a schematic view of the truck body of the present invention illustrating the packer panel in its forward to rear progression, to the phantom line configuration shown, as the same is driven by its threaded drive shaft.

FIGS. 8 and 9 are fragmentary top and side elevations of caster structure utilized in supporting, against lateral sway or movement, the upper opposite sides of the packer panel, this so that the same will not bind during its travel along the threaded drive shaft.

FIG. 10 is an enlarged fragmentary side elevation, principally in section, illustrating the bearing structure at the door of the truck body; in FIG. 10 the bearing structure has been advanced forwardly so as to provide an appropriate supporting journal for the rear extremity of the threaded shaft.

FIG. 11 is a view similar to FIG. 10 but illustrates the structure as being in a condition wherein the bearing structure has been displaced rearwardly, thereby releasing the journal relative to the threaded shaft and permitting the rear door of the truck of FIG. 1 to be opened rearwardly; at this point it is noted that the packer panel itself supports the rear extremity of the threaded shaft.

FIG. 12 is a view taken along the line 12—12 in FIG. 11, illustrating the handle or lever structure utilized to advance and withdraw the bearing structure of the subject truck body door.

FIG. 13 is a fragmentary, perspective view of the rear door of the truck body, illustrating latching means that can be used to close the same.

FIG. 14 is an electrical schematic of electrical circuit means that can be utilized to operate the packer panel.

FIG. 16 is a schematic of an alternative system utilizing the power take-off of the vehicle to drive not only the threaded shaft but also the control means associated therewith.

FIG. 18 is an enlarged side elevation of the shaft drive structure disposed proximate the cab in FIG. 1.

FIG. 19 is a front elevation of the meshed spar gear means of FIG. 18.

FIGS. 20 and 21 are schematic diagrams of limit switch placement relative to the revolvement the cam wheel of FIG. 19.

Figure 15:
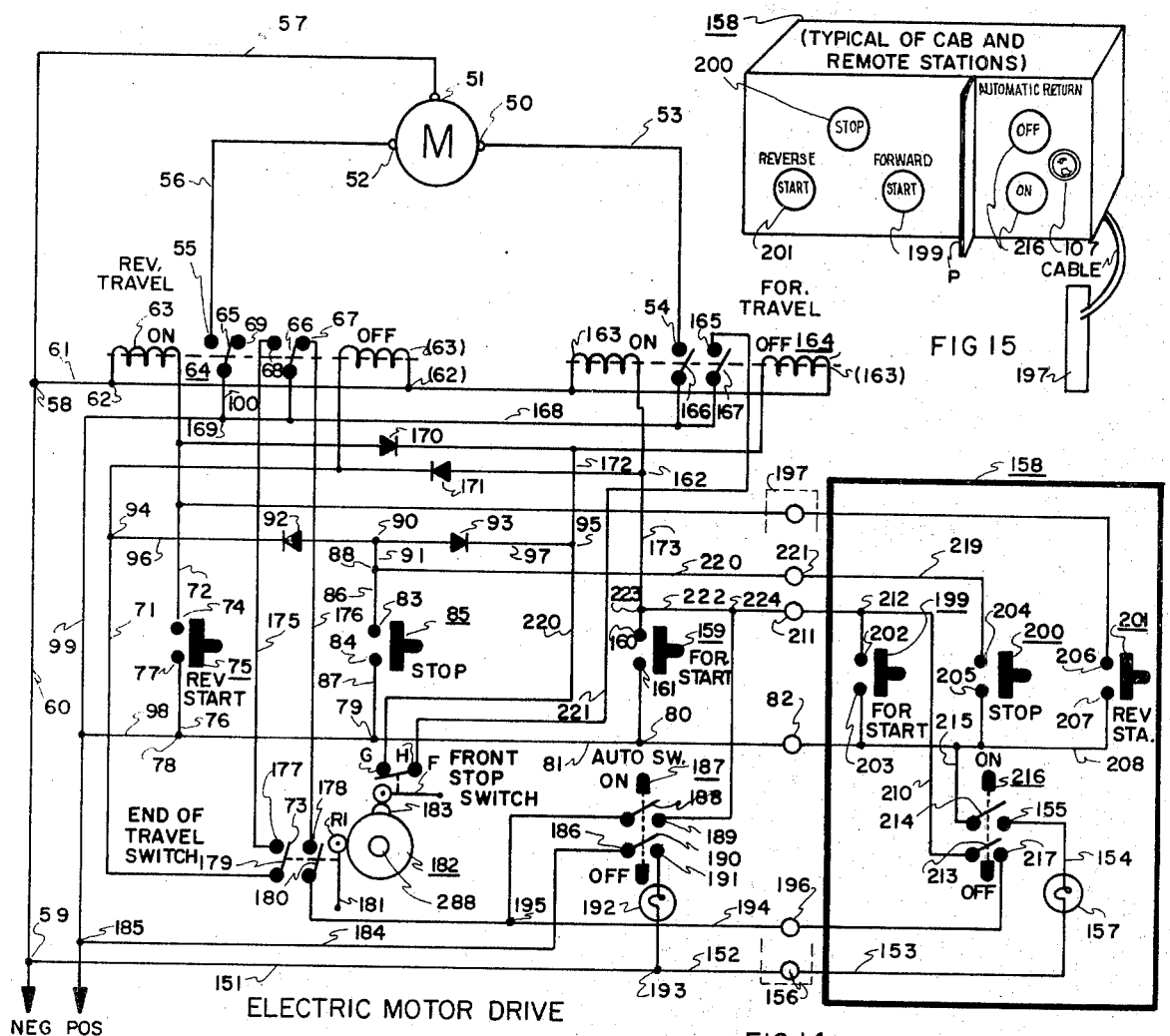
FIG. 15 is a perspective view of a typical master or remote station unit utilized in connection with the circuitry of FIG. 14.

In FIG. 1 the truck 10 includes the usual tractor 11 and has a rigid frame truck body 12 which is specially designed to receive municipal waste materials such as garbage at forward, side load opening O for transport to disposal sites or other appropriate areas preparatory to dumping via unload opening O'. Truck body 12 includes a packer panel 13 having upstanding vertical portion 14 and also a lower, rearwardly angulated blade portion 15 integral therewith. The packer panel 15 is also detailed in fragmentary view in FIG. 2 where it is seen that blade portion 15 may in fact comprise a bent portion of the packer panel 13. Threaded block 16 is bolted to the packer panel 13 by means of bolt attachments 17 passing through cooperating apertures 18 and 19. The threaded block 16 includes a forward flange 20 to effect a secure fastening of the block to the packer panel. Inner aperture 21 is threaded at 22, as indicated, to receive elongate horizontal threaded shaft 23. Attached to the threaded block 16, by means of bolt attachments 24, is a shaft cleaner unit 25. The cleaner unit 25 includes a pair of half-shall shaped members 26 and 27, see FIG. 2, which include mounting apertures 28 for the bolt attachments 24 and also radial wall apertures 29 and 30. These latter, see FIG. 3, receive threaded brush units 31 a representative one of which is illustrated in FIG. 3. The threaded brush unit 31 of FIG. 3 is shown to include an exteriorly threaded sleeve 32 having interior aperture 33. The latter retains the parallel, closely held ends 34' of brush elements 35. These may comprise wire or fiber and constitute a single brush 36 respectively disposed by its sleeve into a respective aperture 30.

Plural, identically constructed thread cleaner blades 37 and 38 are bolted by attachments 34 to the remainder of the structure as shown in FIG. 2. These thread cleaner blades as at 38, see FIG. 4, may be two or three or more in number and proceed radially inwardly such that their surfaces 39 engage the recesses 39' between the threads on the threaded shaft. It is noted that these blade edges go between and through the area between the threads to actually contact the shaft at the bottom portion of the thread at its groove. Members 26 will generally be formed similar to that shown in FIG. 5 but will be interiorly, cylindrically arcuate as generally indicated in FIG. 2. A general schematic indication of the positionment and progression of packer panel 13 is illustrated in FIG. 7. It is noted that the same proceeds in the direction from right to left, to the phantom line configuration shown at 13' as the same is used to advance garbage rearwardly and to tend to pack the same for preparatory to further load introductions. The packer panel 13 is carried by structure 40 including an outer housing 41 journalling a pair of casters or wheels 42. These will be disposed at the bottom on opposite sides of the packer panel structure. The casters are constructed to support the vehicle as the same advances over bed 43 of the bottom of the track. Channel shaped track 44 is bolted by attachments 45 to the bottom of the truck bed at 46. Support frame 47 mounts the several caster units 48 of which representative caster or roller unit 42 forms a part. The remainder, of course, includes the usual inverted bracket 49 and journalling axle 49'.

It will be understood that the foregoing structure will be disposed on both sides of the truck body so as to support both lateral edges of the packer panel 13. A pair of mutually facing U-configured tracks 100 are disposed on opposite sides of the truck body and are bolted in place by attachments 101. The rollers or casters 102 journaled by their shafts 103 to respective brackets 104 and the latter are secured in place by attachments 104. Bracket 104 is an individual bracket mounting all of the rollers 102. See FIG. 2. A bracket or plate 106 mounts the series of casters with their brackets to fixed plate 107, the same securing the roller assembly to the remainder of the packer panel structure. Thus it is seen that the packer panel is not only supported by rolling means at its bottom but also at its lower side edges as per FIG. 6.

FIGS. 8 and 9 illustrate that there will also be supplied a series of rollers on opposite sides of the top edge of the packer panel. Thus, casters 108 are journaled by their shafts or pins 109 to a U-configured channel or bracket 110. The latter will be bolted or otherwise attached, as by means 111, to the remainder of the structure at 112. As an alternative, support member 113 and 114 may be welded together and to the general packer panel construction at 13 to receive support structure for so journalling the rollers or casters 108.

An end view of the casters 108 in FIG. 8 is illustrated in FIG. 9. It is thus seen that the track 115 is bolted to the side of the truck body 12 at the top of the side S thereof.

It thus will be noted that each of the tracks is provided with a cleaner element at both extremities, back and front, of both sides of the bottom and also both sides of the top of the track assemblies for the packer panel 13. Thus, angulated blades 117 and 118 will be provided for each of the caster assemblies on each side of the packer panel at the upper portion thereof. Correspondingly, blades 120 and 121 will be supplied to scrape debris from the bottom of the tracks accommodating the bottom casters 42. In general, there will also be supplied blades 123 and 124 to scrape debris out of the lower side tracks at 100. These will be welded or otherwise secured to opposite side extremities of the packer panel and caster mount assembly.

In returning to FIG. 1 it is seen that the threaded shaft 23 has a rear-end 118 that its unthreaded and provided with a conical portion 119. The door 120 of the truck body is hinged in a conventional manner at 121 and includes aperture 122 in conjunction with certain lock elements 123 and 124.

Door 120 includes aperture 122 includes a cylindrical housing 125, which contains structure now to be described, includes a cylindrical bearing member 126 provided with annular slot 127 receiving the bifurcated end 128 of lever 129. Lever 129 is journaled by pin 130 to a support bracket 131, the latter being welded at 132 to the door 120. The lower extremities of the bifurcated portion 128 are provided with rollers at 133 journaled as indicated at 134. Bearing member 126 includes a central bore 135 which receives the end 118 of threaded shaft 23. Bearing means 136 is disposed as indicated and is locked in place at its outer race by shaft cleaning unit 137. The latter includes a pair of casing or housing halves 138 each being provided with threaded apertures 139 for receiving a plurality of units 31 shown in FIG. 3. This time, however, the casing is tapered inwardly so as to provide a conical half section at its inner surface 140. Pins 141 and corresponding apertures 142 keep the two halves of the bearing cleaning unit together. The same may be threaded as a unit as by a spanner wrench or other suitable tool for threading the two halves into the threaded area 143 of bearing member 126.

FIGS. 10 and 11 illustrate the condition in door-closed position wherein a shaft is journaled within the bearing structure as seen in FIG. 10. When it is desired to separate the bearing B from the shaft, then the lever 129 is moved in a clockwise direction as illustrated in FIG. 11 so as to draw the bearing B outwardly to the left in the manner shown in FIG. 11.

As the lever 129 is rotationally displaced in a clockwise direction, so as to pull the bearing unit to the left, the brushes 35 perform no useful function; however, upon a return of the bearing to its proper position as seen in FIG. 11 — this is upon preliminary door closure and a rotational displacement of lever 129 in a counter-clockwise direction — the brushes 35 will operate to clean the shaft 23 at portion 118 to prevent shaft debris from entering into the bearing structure. This is most important.

FIG. 12 simply illustrates a transverse section of the structure of FIGS. 10 and 11 relative to operation of the handle or lever 129.

FIG. 13 illustrates that the door 120 may be closed and locked, see also FIG. 1, by means of latches 144 and 145 engaging the pins or bars 123 and 124 in FIG. 1. Thus, a rotation of lever 148 about its fulcrum pin 140 to a downward position will tend to lock the door in place as the lever 148 is overtoggled about its fulcrum 149.

Motor M, see FIGS. 14 and 18, includes forward, negative and reverse terminals 50, 51 and 52, respectively. Lead 53 is connected between terminal 50 and relay terminal 54. Relay terminal 55 is connected by lead 56 to terminal 52. Lead 57 is connected to junction terminal 58. Junction terminals 58 and 59 are connected together by lead 60. Lead 61 connects junction terminal 58 to center tap 62 of relay coil 63 of the relay 64. Relay 64 includes switch arms 65 and 66 and also terminals 67, 68 as well as dead terminal 69. Opposite extremities of relay coil 63 are connected by leads 71 and 72 to cam operated switch arm 73 and also to terminal 74 of reverse start switch 75. Lead 76 connects terminal 77 of the aforementioned switch to junction 78. Junctions 78, 79 and 80 are connected by a common lead 81 to bus terminal 82. Terminals 83 and 84 of switch 85 are connected by respective leads 86 and 87 to terminals 88 and 79 as shown. Terminals 88 and 90 are connected together by lead 91. Diodes, connected in the direction shown at 92, 93, interconnect junction 90 with junctions 94 and 95 by leads 96 and 97. Electrical leads 98, 99 and 100 interconnect junction terminal 78 with switch arm contact 65.

Leads 151–154 are serially connected between junction 59 and switch contact 155, which circuit includes bus terminal 156 and lamp 157. Block 158 comprises a remote station which may be positioned in a fixed or movable condition outside of the truck, this so that the operator may watch the operation of the equipment from a position remote from his cab. Accordingly, 158 identifies a remote station that may be employed, the remainder of the circuit being the cab circuit. Forward start push-button switch 159 includes contacts 160 and 161. Switch contacts 160 and 161 are connected to junctions 80 and 162 and connect to winding 163 of forward travel latching relay 164. The latter also include switch contact 165 and switch arms 166 and 167. Switch arms 166 and 167 are connected by lead 168 to junction 169. Diodes 170 and 171 are interposed in the circuit between leads 72 and 172 and also between leads 71 and 173 in the manner indicated. Leads 175 and 176 respectively interconnect contact 68 with contact 177 and also contact 67 with contact 178 in the manner indicated. Switch arms 179 and 180 are ganged together to a roller arm 181 which rides upon cam wheel 182 having cam protuberances 183. Lead 184 interconnects junction 185 with switch arm 186 of auto switch 187. Auto switch 187 is a bi-stable switch such that when the "on" button is pressed contact is made as between switch arm 188 and contact 189 and, correspondingly, between switch arm 190 and contact 191. When the "off" button is pressed then, both switch arms or contacts are released from electrical contact with terminals 189 and 191. Indicator light 192 is interposed between contact 191 and junction 193. Lead 194 interconnects junction 195 with bus terminal 196 of bus 197.

Remote station 158 includes push buttons 199, 200 and 201 which are the forward, stop and reverse start switches. The respective switches include, respectively, terminals 202 and 203, 204 and 205, and 206 and 207. Lead 208 is a common lead connection terminals 203, 205 and 207 to switch arm contact 214. Lead 210 interconnects terminal 211 with junction 212 and also with switch arm 213. Switch arm 214 is interconnected by lead 215 to lead 108. Auto switch 216 is likewise a bi-stable switch, with the on button pressing the arm contacts 213 and 214 downwardly to make contact and the off contact pushing the switch arm upwardly to break contact with respective terminals 155 and 217. Leads 219 and 220 interconnect to bus terminal 221 and likewise connect to terminals 204 and junction 88 as indicated. Lead 222 interconnects junction 223 with junction 224 and terminal 211 as shown. Lead 210 interconnects terminal 211 and 212 to switch arm 213 of auto switch 216.

The circuitry as thus far described operates as follows. The "forward travel" and "reverse travel" relays 164 and 64 are latching relays of respective bi-stable states. This is to say, when the left hand side of respective coils 63 and 163 is energized, the respective switch arms are pulled to the left in direction toward the coil to engage contacts 55, 68, 54 and 165. When, on the other hand, the right hand or "off" side of the respective coils is energized, then the switch arms fall to the right to engage contacts 69, 67 and open 165. The "reverse start" and "forward start" push buttons of the cab and remote stations at 159, 75, 199 and 201 are normal, spring-biased push button switches which are closed when the buttons are depressed. "Stop" switches are likewise push button switches at 85 and 200. Assume by way of example that the packer panel of the truck body is at the extreme forward or cab portion. To move the packer panel rearwardly, to compress debris dumped into the truck body to the left or rear of the packer panel, the operator will press either at the cab station or at the remote station the "reverse start" switch push button 75 or 201. This action energizes reverse travel relay 64, relative to the left hand side of the coil, so as to close the switch arms to the left against contacts 55 and 68. Such an action supplies voltage to motor M through contact 169 and leads 100 and 56 through switch arm 65 so that the reversing motor M proceeds in reverse revolvement to move the packer panel rearwardly. At the same time the cam wheel, geared to motor M, revolves from the position shown in the figure to a position in a clockwise direction to the right so that cam 183 engages roller R1, raising the same to close the end-of-travel contacts by switch arms 73 and 180. This action energizes the right hand side of coil 63 or the "off" side so that switch arms 65 and 66 are drawn to the right to break the motor circuit as well as the end-of-travel circuit associated with cam wheel 182. Thus, at this point, positive voltage is cut off from the motor M.

When the reverse travel relay 64 is in such off position and the switch, namely switch arm 66 and contact 67 are closed, then positive voltage will be fed through such contact and through the cam wheel auto contacts via switch arm 180 and contact 178 to the forward travel relay "on side," i.e. the left hand side, which action closes the forward travel relay contacts and starts the motor automatically to return the packer panel to the forward end of the truck.

When the threaded shaft returns the packer panel to the front of the truck body, then the cam 183 on cam wheel 182 engages front stop switch F to close switch contacts G and H. It is noted that G and H are respectively connected by leads 220 and 221 to junction 95 and contact 165 in the manner indicated. The same energizes the off portion of coil 163 so as to return the forward travel relay to off position. It is noted that this relay as well as the other latches in either "on" or "off" positions.

Whenever the auto switch 187 is closed, the indicator light 192 will come on. If the auto switch is in the off position, that is, if the auto switch contacts are broken, then the packer panel will stop at the rear of the truck and will not return.

In such a case, then to return the packer panel to the front of the truck body, the "forward start" button 159 is pressed so as to close this switch. This action applies positive voltage to the "on" side of the "forward travel" relay 164 which in turn closes the motor circuit applied to motor M.

When cam 183 on cam wheel 182 returns to its "front stop position," indicating that the packer panel has returned to the front of the truck, then a pulse will be applied to the "off" side of the "forward travel" relay 164 and return the contacts to their open position.

When it is desired to stop the packer panel between the two, fore and aft positions, the stop switch 85 is depressed thus applying positive voltage to both relays "off" coil portions which in turn stops the motor M.

Blocking diodes at 92 and 93 as well as at 170 and 171 are provided so that a signal from one "off" coil portion of a respective relay will not effect the "off" coil portion of the remaining relay. Blocking diodes are provided between the "on" coil of the forward travel relay and the "off" coil of the reverse travel relay, and vice versa, so that when the motor circuit is engaged and the motor is running in one direction, the "reverse direction" current cannot be applied at the same time. It is noted that these diodes permit the current to flow only in the direction of the arrow.

Any number of remote stations duplicating the switches in the main control panel can be used by connecting them to the terminals as indicated.

The remote station 158 is attached by a length of electrical cable and connected directly to the terminal bus 197 or as by a socket connection so that the operator can stand at the back or side of the truck and observe the dumping action and thus be ready to stop the packer panel if jamming or other emergency takes place. The control box may have a master partition P between the operating switches and the automatic switches so that they cannot be confused.

Power take-off 226 is conventional having "reverse," "neutral," and "forward" positions as indicated via its pivot arm 227. The same is connected to the unit 228 in a conventional manner. Lever 229 has forward and reverse positions as indicated and includes a fulcrum pivot 230. Arm 231 is pivoted at 232A to lever 229 and is likewise pivoted at 233 to power takeoff arm 227. Accordingly, a forward movement of lever 229 produces a forward positioning of the power take-off drive. The power take-off 226 is coupled by shaft 228 to conventional magnetic clutch 229 which, when energized, engages the clutch and hench the shaft connection 228 to shaft 230. The latter leads to the gear reduction unit or other means leading to the revolving threaded shaft of the truck body. Switches 232 and 232' are actuated by the lower portion 233 of lever 229. Accordingly, a forward movement of lever 229 will produce engagement of switch arm 234 with contact 235. Additionally, a reverse movement of the lever 229 will produce engagement of switch arm 236 with switch contact 237. The battery generator system of the vehicle supplies power to the positive and negative terminals 238 and 239. The positive terminal is connected by lead 240 to junction 241. The latter is connected by lead 242 to switch contact 243. Switch arm 244 is connected by lead 245 to switch arm 246. Lead 247 is coupled between junction 241 and switch contact 248. Switch arm 249 is connected to contact 235 by lead 250. Cam wheel 251 includes cam portion 252 and also a cam slot or depression 253. Cam 254 and cam 255 engage the cam wheel and selectively ride upon the cam surface 256. Lead 257 is connected between input terminal 238 and the magnetic clutch 229. Correspondingly, lead 258 is connected between the magnetic clutch and switch arm 234.

Where a power take-off drive is used, the operation is as follows:

Assuming the packer panel is in the extreme forward position, then the handle and lever 229 will be pulled rearwardly to the reverse position. This action closes the reverse switch, namely switch arm 236 and contact 237 at the bottom of the lever 229.

Current hence from the positive terminal at 239 flows to the closed "reverse" cam switch and through the above-mentioned "reverse lever switch" at 236 and 246, and engages the magnetic clutch. The power take-off is thus engaged when the lever is pulled back from its neutral position.

Lever 229 can be returned to the neutral position at any time so that the magnetic clutch can be disengaged to stop transmission of power from the power take-off to the threaded shaft drive of the truck body.

Figure 17:
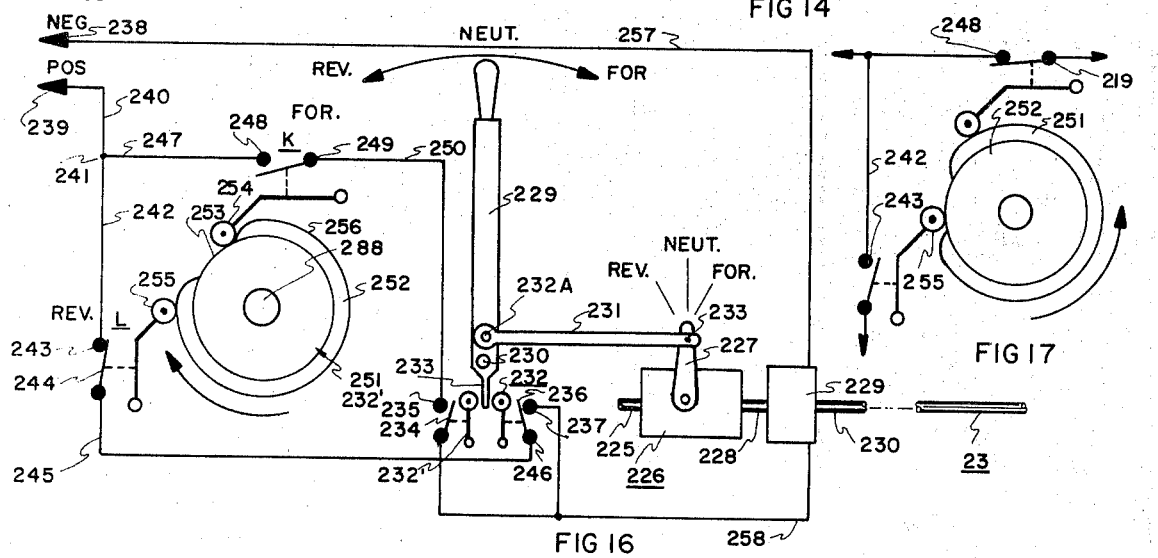
FIG. 17 is a view of the cam structure of FIG. 16 in an alternative position.

If, however, the lever remains back in the reverse position until the packer panel reaches the extreme rear position, then the cam reverse switch will open at 243, 244 and the magnetic clutch will disengage. The cam switch action is indicated in the figure to the right, see FIG. 17.

To return the packer panel to the front or forward position, the lever 229 is pushed into "for" position. This action closes the switch including contacts 234 and 235 such that current flows from positive "pos" through the now closed "for" or forward cam switch at 248, 249 and through the above-mentioned lever switch at 234 and 235 engaging the magnetic clutch which turns the threaded shaft to drive the subject packer panel.

If the lever is held back the packer panel will return to the front of the truck body and be stopped at its forward extremity for the "for" cam switch opening.

A second station can be added by attaching a second lever to the first by way of conventional, appropriate linkage, not shown.

Both the electric motor drive and also the power take-off drive the cam wheel will revolve 270° which corresponds to the length of maximum travel, from front to rear, of the packer panel.

In one system as shown in FIG. 18, the motor M is connected by its shaft 270 and by bolted flanges 271 and 272 to gear reduction box 273. The output shaft thereof at 274 is connected by sprocket 275 to sprocket 276 via sprocket chain 277. Sprocket 276 is keyed at 278 to threaded shaft 23 of the truck body. Suitable bearings at 279 will be supplied for journalling shaft 23 relative to the front partition 280 of the truck body. Stub shaft 281 includes a flange 282 bolted by bolts 283 to the end of the threaded shaft. Gear 284 and gear 285 intermesh, both being keyed to their respective shafts 281 and 286, and the same are mechanically coupled to gear reducer 287. To shaft 288 of the latter may be keyed to either cam wheel 251 of FIG. 16 or cam wheel 182 of FIG. 14. There will be many ways, of course, for securing sprocket 276 to shaft 23. One way is indicated in FIG. 22 wherein the hub H is shown to include plural halves 290 and 291 which are bolted at 292 and 293 and provided with keyway slot 294 accommodating key 278.

FIGS. 20 and 21 illustrate in elevation cam wheel 182 and the switch assemblies K and L of FIG. 14 coacting therewith and particularly with cam 183. Upon a revolvement in a counter-clockwise direction of substantially 270°, the cam 183 advances to the position shown n FIG. 21 so as to actuate switching at L of FIG. 14. It is noted that when the cam raises the switch, the switch engages or comes to closed condition.

FIG. 19 illustrates a side view of the structure of FIG. 21 wherein it is seen that cam wheel 182 is keyed to the gear reducing unit 287 which may comprise worm gear N, keyed to gear 285 which meshes with gear 284.

What is provided hence is a truck having a truck body wherein a maximum of the space therein can be used for both packing and also receiving debris such as municipal waste and garbage. The shaft 23 driving the packer panel 32 may be driven directly by the vehicle at its power take-off or by a separate electric motor that has been appropriately geared down to perform the function intended. Means are provided for adequately supporting the packer panel, see FIGS. 2, 6 and 8 by way of example, and switch means are provided relative to a cam wheel, revolving in an appropriate gear reduction relationship with the revolving shaft so that circuitry can be actuated to stop a packer panel movement at predetermined extremities of travel. Additionally, the packer panel can be stopped intermediate such extremities as above described in connection with the action of the stop buttons in FIG. 14 and also lever 229 in FIG. 16. Appropriately bearings and brush means are employed to keep the shaft journals clean, and a rearwardly displaceable bearing means is used to support the rear extremity of the primary threaded shaft 23. When the rear door at 120 in FIG. 1 is opened, the packer panel will have advanced rearwardly at portion 118 to itself support that end of the threaded shaft. Thus, all of the material in the truck can be pushed outwardly from the truck by the packer panel simply advancing rearwardly to its extreme position. Once this is accomplished, then the user can reverse direction of travel of the packer panel such that the same goes forwardly. But prior thereto, the door 120 is closed and the lever 129 in FIG. 11 is advanced rearwardly to the position shown in FIG. 10 such that the bearing B can be re-engaged with the extremity 118 of the threaded shaft.

While particular embodiments of the invention have been shown and described, it will be obvious to those skilled in the art the various changes and modifications which may be made without departing from the essential features of the present invention and, therefore, the aim in the appended claims is to cover all such changes and modifications as fall within the true spirit and scope of the invention.

I claim:

1. A waste receiving, transport, and dump vehicle having a truck body, said truck body having a forward opening, a rear opening, and an operable rear door operably disposed over said rear opening, an upstanding packer panel disposed within said truck body and constructed to move rearwardly water materials introduced into said forward opening, a threaded shaft having threads and journaled forwardly relative to said truck body, said packer panel being in threaded engagement with said threaded shaft and constructed to be driven thereby, and means for revolving in opposite directions and also stopping the revolvement of said threaded shaft, wherein said shaft includes a rear journalling portion, said door comprising a rear door hinged at one side to said truck body and including locking means for selectively locking said door closed, said door including journalling means for releasably journalling said shaft at said rear journalling portion to said door, and wherein said journalling means includes a bearing mount secured to said door and a bearing translationally disposed within said bearing mount, and means for selectively withdrawing rearwardly said bearing relative to said bearing mount, whereby to release said bearing from said shaft and enable said door to be hingedly opened.

2. Structure according to claim 1 wherein said withdrawing means comprises a lever pivoted to and rearwardly of said door and having means for articulatively engaging said bearing.

3. Structure according to claim 1 wherein said rear journalling portion of said shaft is tapered, said bearing also being tapered in correspondence therewith.

4. Structure according to claim 3 wherein said bearing includes radially extending brush means releasably engaging said threaded shaft at said rear journalling portion thereof, for cleaning said shaft portion preparatory to entrance thereof into said bearing.

* * * * *